United States Patent
Yousef et al.

(10) Patent No.: US 12,466,790 B1
(45) Date of Patent: Nov. 11, 2025

(54) BIS UREA-BASED ORGANOSELENIUM COMPOUND AND METHOD FOR TREATING CANCER

(71) Applicant: IMAM MOHAMMAD IBN SAUD ISLAMIC UNIVERSITY, Riyadh (SA)

(72) Inventors: Tarek Ahmed Yousef, Riyadh (SA); Saad Shaaban, Almansourah (EG); Ahmed A. Al-Karmalawy, Baghdad (IQ); Marwa Sharaky, Cairo (EG); Hussein Ba-Ghazal, Riyadh (SA); Mohamed Alaasar, Halle Saale (DE)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/957,414

(22) Filed: Nov. 22, 2024

(51) Int. Cl.
*A61P 35/00* (2006.01)
*A61K 31/17* (2006.01)
*C07C 391/02* (2006.01)

(52) U.S. Cl.
CPC ............ *C07C 391/02* (2013.01); *A61K 31/17* (2013.01); *A61P 35/00* (2018.01)

(58) Field of Classification Search
CPC ....... C07C 391/02; A61K 31/17; A61P 35/00; A61P 35/04; A61P 35/06
See application file for complete search history.

(56) References Cited

U.S. PATENT DOCUMENTS 11,970,464 B1   4/2024   Shaaban et al.
11,999,708 B1   6/2024   Shaaban et al.

FOREIGN PATENT DOCUMENTS

WO   2004047925 A2   6/2004

OTHER PUBLICATIONS

Altea-Manzano et al. (EMBO Reports (2020) 21: e50635. DOI 10.15252/embr.202050635). (Year: 2020).*
Chalak et al. (Life (2024), 14, 417. https://doi.org/10.3390/life14030417). (Year: 2024).*
Tang et al. (Front. Pharmacol. (2024), 15:1466017. doi: 10.3389/fphar.2024.1466017). (Year: 2024).*
Antunes et al. (Bioengineering (2022), 9, 166). (Year: 2022).*
Fardous F El-Senduny, et al., "Urea-functionalized Organoselenium Compounds as Promising anti-HepG2 and Apoptosis-inducing Agents", Future Medicinal Chemistry, vol. 13, Issue 19, Aug. 24, 2021, pp. 1655-1677, 5 Pages.
Yousong Nie, et al.; "New Organoselenium (NSAIDs-Selenourea and Isoselenocyanate) Derivatives as Potential. Antiproliferative Agents: Synthesis, Biological Evaluation and in Silico Calculations", Molecules, vol. 27, Issue 14, Jul. 6, 2022, 4328, 17 Pages.

* cited by examiner

*Primary Examiner* — James H Alstrum-Acevedo
*Assistant Examiner* — Chris E Simmons
(74) *Attorney, Agent, or Firm* — Oblon, McClelland, Maier & Neustadt, L.L.P.

(57) ABSTRACT

A method of treating cancer including administering a bis-(organoselanyl urea)aryl agent having a Formula (I) to a subject with cancer. The method includes effective inhibition of growth of cancer cells using the compound of Formula (I) as compared to doxorubicin.

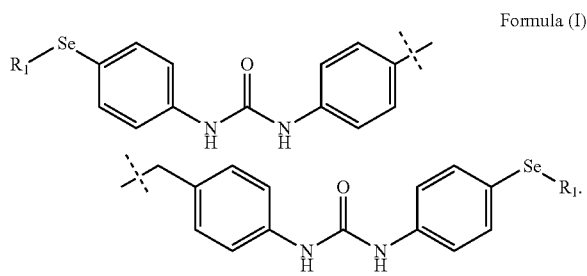

Formula (I)

16 Claims, 5 Drawing Sheets

BIS UREA-BASED ORGANOSELENIUM COMPOUND AND METHOD FOR TREATING CANCER

BACKGROUND

Technical Field

The present disclosure is directed to a method of treating cancer and, more particularly, towards the method of inhibiting the cell growth of cancer cells using a bis urea-based organoselenium compound.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Cancer is a leading cause of death worldwide, with the World Health Organization's Annual Global Cancer Statistics of 2018 indicating 18.1 million new cases and 9.6 million deaths. This increased rates of both cancer diagnoses and deaths creates an urgent need for effective chemotherapies.

Cancer growth inhibitors, also called cancer growth blockers or inhibitor agents, are biological or chemical treatments that target the growth factors responsible for allowing cancer cells to grow and multiply. Cells communicate through a complex signal transduction system, where growth factors bind to receptors on the cell surface, activating a signaling pathway inside the cell that promotes growth. When this process becomes unregulated, it leads to excessive cell division and tumor formation.

Chemotherapy agents' method of action is to attack rapidly dividing cells, which are more likely to be cancer cells than normal cells. Chemotherapy drugs work in several ways, including, but not limited to, damaging the cell's genetic material, which tells it how to repair or copy itself, blocking the chemicals a cell needs to divide, damaging the part of the cell's control center that makes it divide, and interrupting the chemical processes involved in cell division. Chemotherapy agents can damage normal cells, such as hair and skin cells, along with cancer cells, making chemotherapy agents commonly associated with toxicities (i.e., side effects). Common toxicities associated with such agents include myelosuppression, nausea, vomiting, GI side effects, mucositis, alopecia, sterility, infertility, infusion reactions.

While significant advancements have been made in chemotherapy agents, toxic side effects, drug resistance, and treatment costs continue to pose substantial challenges. Recently, both natural and synthetic selenium compounds, along with nano-selenium particles, have gained attention as potential chemotherapy agents due to studies showing selenium supplementation may be helpful in reducing cancer incidence and mortality. While small amounts of selenium are essential for certain biological functions in humans, slightly higher amounts can pose a toxicity risk. Organoselenium compounds are usually favored over inorganic selenium compounds due to their decreased toxicity. The decreased toxicity of organoselenium compounds makes them hopeful candidates as chemotherapy agents due to their decreased toxicities. The effects of organoselenium compounds on cancer, however, depend on small changes in structure, which can lead to more therapeutically effective compounds. As a result, there is an increased need to identify which selenium compounds may be suitable as chemotherapy agents while also balancing the potential toxicity of these agents.

In addition to organoselenium compounds, there has been an increasing interest in the development of urea-based anticancer compounds. Urea and its derivatives have the capability to form multiple stable hydrogen bonds with protein and receptor targets. It is thought that the functionality of urea may be incorporated into pharmaceutical compounds to modulate drug potency and selectivity and improve drug properties in the development of new chemotherapeutic agents. Moreover, urea and its derivatives may have additional chemotherapeutic effects by inducing cancer cell apoptosis through inhibiting multiple kinases in angiogenic pathway and in cell proliferation. Several challenges may occur with urea-based compounds, however, such as nephrotoxicity, arrythmias, and respiratory distress. As a result, there is an increased need to identify which urea-based compounds may be suitable as chemotherapy agents while also balancing the potential toxicity of these agents.

Accordingly, one object of the present disclosure is to develop a bis-(organoselanyl urea)aryl agent with increased bioavailability and reduced toxicity for cancer treatment.

SUMMARY

In an exemplary embodiment, a method of treating a cancer is described. The method comprises administering a bis-(organoselanyl urea)aryl agent having a Formula (I) to a subject with cancer Formula (I)

wherein $R_1$ is an alkenyl group, an alkyne group, a phenyl group, or an alkyl group.

In some embodiments, the method comprises the cancer is selected from the group consisting of an oral squamous cell carcinoma, a hepatocellular carcinoma, a breast cancer, a non-small cell lung cancer, a colorectal carcinoma, and a melanoma cancer.

In some embodiments, the method comprises the bis-(organoselanyl urea)aryl agent has a cancer cell growth inhibition percentage of at least 5% against a cancer cell line.

In some embodiments, the bis-(organoselanyl urea)aryl agent has a non-cancer cell growth inhibition percentage of 15% or less against a non-cancer cell line.

In some embodiments, the cancer is a cancer cell line selected from the group consisting of HN9, HuH7, FaDu, MCF7, HEPG2, A549, HCT116, and A375.

In some embodiments, the bis-(organoselanyl urea)aryl agent has a cancer cell growth inhibition percentage of at least 5% against a cancer cell line, and wherein the cancer cell line is HCT116.

In some embodiments, the bis-(organoselanyl urea)aryl agent has a cancer cell growth inhibition percentage of at least 9% against a cancer cell line, and wherein the cancer cell line is HN9.

In some embodiments, the method of administering the bis-(organoselanyl urea)aryl agent comprises administering at least one dose of 0.01 to 10 mg/kg to the subject.

In some embodiments, the non-cancer cell is a cell line selected from the group consisting of OEC and HSF.

In some embodiments, the bis-(organoselanyl urea)aryl agent has a non-cancer cell growth inhibition percentage of 10% or less against a non-cancer cell line, and wherein the non-cancer cell line is HSF.

In some embodiments, the bis-(organoselanyl urea)aryl agent has a non-cancer cell growth inhibition percentage of 8% or less against a non-cancer cell line, and wherein the non-cancer cell line is OEC.

In some exemplary embodiment, a method of producing a bis-(organoselanyl urea)aryl agent of Formula (I) comprises reacting a selenium aniline with a bis-phenyl isocyanate in an organic solvent to obtain a reaction mixture comprising the bis-(organoselanyl urea)aryl agent.

In some embodiments, the selenium aniline and the bis-phenyl isocyanate are reacted in a molar ratio of 1:4 to 4:1.

In some embodiments, the selenium aniline and the bis-phenyl isocyanate are reacted in a molar ratio of 2.2:1.

In some embodiments, the selenium aniline is 4-(methylselanyl)aniline.

In some embodiments, the bis-phenyl isocyanate is bis(4-isocyanatophenyl)methane.

In some embodiments, the method further comprises stirring the reaction mixture for 6 to 10 h.

In some embodiments, the method further comprises stirring the reaction mixture for 8 hours.

In some embodiments, the organic solvent is at least one selected from the group consisting of hexane, pentane, cyclohexane, benzene, and toluene.

In some embodiments, the organic solvent is toluene.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term 'cancer' refers to all types of cancer, neoplasm, or malignant tumors found in mammals (e.g., humans), including leukemias, lymphomas, carcinomas, and sarcomas. Exemplary cancers that may be treated with the compound or method provided herein include brain cancer, glioma, glioblastoma, neuroblastoma, prostate cancer, colorectal cancer, pancreatic cancer, Medulloblastoma, melanoma, cervical cancer, gastric cancer, ovarian cancer, lung cancer, cancer of the head, Hodgkin's Disease, and Non-Hodgkin's Lymphomas. Exemplary cancers that may be treated with the compound or method provided herein include cancer of the thyroid, endocrine system, brain, breast, cervix, colon, head & neck, liver, kidney, lung, ovary, pancreas, rectum, stomach, and uterus. Additional examples include, thyroid carcinoma, cholangiocarcinoma, pancreatic adenocarcinoma, skin cutaneous melanoma, colon adenocarcinoma, rectum adenocarcinoma, stomach adenocarcinoma, esophageal carcinoma, head and neck squamous cell carcinoma, breast invasive carcinoma, lung adenocarcinoma, lung squamous cell carcinoma, non-small cell lung carcinoma, mesothelioma, multiple myeloma, neuroblastoma, glioma, glioblastoma multiforme, ovarian cancer, rhabdomyosarcoma, primary thrombocytosis, primary macroglobulinemia, primary brain tumors, malignant pancreatic insulanoma, malignant carcinoid, urinary bladder cancer, premalignant skin lesions, testicular cancer, thyroid cancer, neuroblastoma, esophageal cancer, genitourinary tract cancer, malignant hypercalcemia, endometrial cancer, adrenal cortical cancer, neoplasms of the endocrine or exocrine pancreas, medullary thyroid cancer, medullary thyroid carcinoma, melanoma, colorectal cancer, papillary thyroid cancer, hepatocellular carcinoma, or prostate cancer.

An "anticancer agent" or "anticancer compound" as used herein refers to a molecule (e.g., compound, peptide, protein, nucleic acid) used to treat cancer through the destruction or inhibition of cancer cells or tissues. Anticancer agents may be selective for certain cancers or certain tissues.

As used herein, "analogue" refers to a chemical compound that is structurally similar to a parent compound, but differs slightly in composition (e.g., one atom or functional group is different, added, or removed). The analogue may or may not have different chemical or physical properties than the original compound and may or may not have improved biological and/or chemical activity. For example, the analogue may be more hydrophilic, or it may have altered reactivity as compared to the parent compound. The analogue may mimic the chemical and/or biologically active of the parent compound (i.e., it may have similar or identical activity), or, in some cases, may have increased or decreased activity. The analogue may be a naturally or non-naturally occurring variant of the original compound. Other types of analogues include isomers (enantiomers, diastereomers, and the like) and other types of chiral variants of a compound, as well as structural isomers.

As used herein, "alkyl group" refers to monovalent saturated aliphatic hydrocarbyl groups having from 1 to 10 carbon atoms and such as 1 to 6 carbon atoms, or 1 to 5, or 1 to 4, or 1 to 3, or 1 to 2 carbon atoms. This term includes, by way of example, linear and branched hydrocarbyl groups such as methyl ($CH_3$—), ethyl ($CH_3CH_2$—), n-propyl ($CH_3CH_2CH_2$—), isopropyl (($CH_3)_2CH$—), n-butyl ($CH_3CH_2CH_2CH_2$—), isobutyl (($CH_3)_2CHCH_2$—), sec-butyl (($CH_3)(CH_3CH_2)CH$—), t-butyl (t-Bu)(($CH_3)_3C$—), n-pentyl ($CH_3CH_2CH_2CH_2CH_2$—), and neopentyl (($CH_3)_3CCH_2$—).

As used herein, "alkenyl group" refers to straight chain or branched hydrocarbyl groups having from 2 to 6 carbon atoms, for example 2 to 4 carbon atoms and having at least 1, for example from 1 to 2 sites of double bond unsaturation. This term includes, by way of example, bi-vinyl, allyl, and bu-3-en-1-yl. Included within this term are the cis and trans isomers or mixtures of these isomers. Alkenyl groups may be optionally substituted. Substituted alkenyl refers to an alkenyl group as defined herein having from 1 to 5 substituents, or from 1 to 3 substituents, selected from alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, SO-alkyl, —SO-substituted alkyl, SO-aryl, —SO-heteroaryl, —$SO_2$-alkyl, —$SO_2$-substituted alkyl, $SO_2$-aryl and —$SO_2$-heteroaryl.

As used herein, "alkynyl group" refers to straight or branched monovalent hydrocarbyl groups having from 2 to 6 carbon atoms, for example, 2 to 3 carbon atoms and having at least 1 and for example, from 1 to 2 sites of triple bond unsaturation. Examples of such alkynyl groups include acetylenyl (C≡CH), and propargyl ($CH_2$C≡CH). Alkynyl groups may be optionally substituted. Substituted alkynyl refers to an alkynyl group as defined herein having from 1 to 5 substituents, or from 1 to 3 substituents, selected from deuterium, alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO— substituted alkyl, SO-aryl, —SO-heteroaryl, —$SO_2$-alkyl, $SO_2$-substituted alkyl, —$SO_2$-aryl, and —$SO_2$-heteroaryl.

As used herein, the term "phenyl group" refers to a substituent derived from phenol or another aromatic hydrocarbon compound. A phenyl group has a total of six ring atoms, unless otherwise specified, and has one ring. A phenyl group may be optionally substituted. A substituted phenyl group refers to a phenyl group having one or more substituent groups (including halogens, hydrocarbyl groups, or hydrocarboxy groups, among others) located on an aromatic hydrocarbon ring or ring system carbon atom.

As used herein, "derivative" refers to a chemically or biologically modified version of a chemical compound that is structurally similar to a parent compound and (actually or theoretically) derivable from that parent compound. A "derivative" differs from an "analogue" in that a parent compound may be the starting material to generate a "derivative," whereas the parent compound may not necessarily be used as the starting material to generate an "analogue." A derivative may or may not have different chemical or physical properties of the parent compound. For example, the derivative may be more hydrophilic, or it may have altered reactivity as compared to the parent compound. Derivatization (i.e., modification) may involve the substitution of one or more moieties within the molecule (e.g., a change in a functional group). The term "derivative" also includes conjugates, and prodrugs of a parent compound (i.e., chemically modified derivatives that can be converted into the original compound under physiological conditions).

The term "therapeutically effective amount" as used herein refers to the amount of the complex being administered which will relieve to some extent one or more of the symptoms of the disorder being treated. In reference to cancer or pathologies related to increased cell division, a therapeutically effective amount refers to that amount which has the effect of at least one of the following: (1) reducing the size of a tumor, (2) inhibiting (that is, slowing to some extent, preferably stopping) aberrant cell division, growth or proliferation, for example, cancer cell division, (3) preventing or reducing the metastasis of cancer cells, (4) relieving to some extent (or, preferably, eliminating) one or more symptoms associated with a pathology related to or caused in part by unregulated or aberrant cellular division, including for example, cancer and (5) inducing apoptosis of cancer cells or tumor cells.

As used herein, the terms "therapies" and "therapy" can refer to any method(s), composition(s), and/or agent(s), and/or complexes that can be used in the prevention, treatment and/or management of a cancer or one or more symptoms thereof.

As used herein, the terms "treat," "treatment," and "treating" in the context of the administration of a therapy to a subject in need thereof refer to the reduction or inhibition of the progression and or duration of cancer, the reduction or amelioration of the severity of cancer, and/or the amelioration of one or more symptoms thereof resulting from the administration of one or more therapies. In some embodiments, the subject is a mammalian subject. In one embodiment, the subject is a human. "Treating" or "treatment" of a disease includes preventing the disease from occurring in a subject that may be predisposed to the disease but does not yet experience or exhibit symptoms of the disease (prophylactic treatment), inhibiting the disease (slowing or arresting its development), providing relief from the symptoms or side-effects of the disease (including palliative treatment), and relieving the disease (causing regression of the disease). With regard to cancer or hyperplasia, these terms simply mean that the life expectancy of an individual affected with cancer will be increased or that one or more of the symptoms of the disease will be reduced. In specific embodiments, such terms refer to one, two or three or more results following the administration of one, two, three or more therapies: (1) a stabilization, reduction or elimination of the cancer stem cell population; (2) a stabilization, reduction or elimination in the cancer cell population; (3) a stabilization or reduction in the growth of a tumor or neoplasm; (4) an impairment in the formation of a tumor; (5) eradication, removal, or control of primary, regional and/or metastatic cancer; (6) a reduction in mortality; (7) an increase in disease-free, relapse-free, progression-free, and/or overall survival, duration, or rate; (8) an increase in the response rate, the durability of response, or number of patients who respond or are in remission; (9) a decrease in hospitalization rate, (10) a decrease in hospitalization lengths, (11) the size of the tumor is maintained and does not increase or increases by less than 10%, preferably less than 5%, preferably less than 4%, preferably less than 2%, and (12) an increase in the number of patients in remission. In certain embodiments, such terms refer to a stabilization or reduction in cancer stem cell population. In some embodiments, such terms refer to a stabilization or reduction in the growth of cancer cells. In some embodiments, such terms refer to stabilization or reduction in cancer stem cell population and a reduction in the cancer cell population. In some embodiments, such terms refer to a stabilization or reduction in the growth and or formation of a tumor. In some embodiments, such terms refer to the eradication, removal, or control of primary, regional, or metastatic cancer (e.g., the minimization or delay of the spread of cancer). In some embodiments, such terms refer to a reduction in mortality and/or an increase in the survival rate of a patient population. In further embodiments, such terms refer to an increase in the response rate, the durability of response, or the number of patients who respond or are in remission. In some embodiments, such terms refer to a decrease in the hospitalization rate of a patient population and/or a decrease in hospitalization length for a patient population.

A "pharmaceutical composition" refers to a mixture of the compounds described herein or pharmaceutically acceptable salts, esters, or prodrugs thereof, with other chemical components, such as physiologically acceptable carriers and excipients.

As used herein, the terms "pharmaceutically acceptable salt" or "pharmaceutically acceptable ester" refers to a compound in a pharmaceutically acceptable form such as an ester, a phosphate ester, a salt of an ester, or a related) which, upon administration to a subject in need thereof, provides the compound of Formula (I) described herein. Pharmaceutically acceptable salts and esters retain the biological effectiveness and properties of the free bases, which are obtained by reaction with inorganic or organic acids such as hydrochloric acid, hydrobromic acid, sulfuric acid, nitric acid, phosphoric acid, methanesulfonic acid, ethanesulfonic acid, p-toluenesulfonic acid, salicylic acid, malic acid, maleic acid, succinic acid, tartaric acid, citric acid, and the like. Suitable salts include those derived from alkali metals such as potassium and sodium, and alkaline earth metals such as calcium and magnesium, among numerous other acids well-known in the art.

As used herein, a "pharmaceutically acceptable carrier" refers to a carrier or diluent that does not cause significant irritation to an organism and does not abrogate the biological activity and properties of the compound of Formula (I). The term carrier encompasses any excipient, diluent, filler, salt, buffer, stabilizer, solubilizer, lipid, stabilizer, or other material well known in the art for use in pharmaceutical formulations. The choice of a carrier for use in a composition will depend upon the intended route of administration for the composition. Examples of physiologically acceptable carriers include buffers (e.g., phosphate buffers, citrate buffer, and buffers with other organic acids), antioxidants (e.g., ascorbic acid and low molecular weight (less than about 10 residues) polypeptides), proteins (e.g., serum albumin, gelatin, or immunoglobulins), hydrophilic polymers (e.g., polyvinylpyrrolidone), amino acids (e.g., glycine, glutamine, asparagine, arginine or lysine) monosaccharides, disaccharides, other carbohydrates (e.g., glucose, mannose, or dextrins), chelating agents (e.g., EDTA), sugar alcohols (e.g., mannitol or sorbitol) salt-forming counterions (e.g., sodium), and/or nonionic surfactants. Selection of such carriers for pharmaceutical formulation is known to one of ordinary skill in the art.

An "excipient" refers to an inert substance added to a pharmaceutical composition to facilitate the administration of a compound. Examples, without limitation, of excipients include calcium carbonate, calcium phosphate, various sugars and types of starch, cellulose derivatives, gelatin, vegetable oils, and polyethylene glycols.

As used herein, the terms the terms "patient", "subject", and "individual" are used interchangeably. As used herein, they refer to individuals suffering from a disease and encompass mammals. None of the terms require that the individual be under the care and/or supervision of a medical professional. Mammals are any member of the mammalian class, including but are not limited to humans, non-human primates, such as chimpanzees, and other apes and monkey species, farm animals, such as cattle, horses, sheep, goats, swine, domestic animals, such as rabbits, dogs, and cats, laboratory animals including rodents, such as rats, mice and guinea pigs, and the like. In preferred embodiments, the subject is a human.

The present disclosure is further intended to include all isotopes of atoms occurring in the present compounds. Isotopes include those atoms having the same atomic number but different mass numbers. By way of general example, and without limitation, isotopes of hydrogen include deuterium and tritium. Isotopes of carbon include $^{13}C$ and $^{14}C$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

According to one aspect of the present disclosure, a method for inhibiting the proliferation of cancer cells is described. In one embodiment, the cancer is selected from the group of oral squamous cell carcinoma, hepatocellular carcinoma, breast cancer, non-small cell lung cancer, colorectal carcinoma, and melanoma cancer. In one embodiment, the method comprises administering a bis-(organoselanyl urea)aryl agent having Formula (I) or its salts, solvates, isomers, derivatives, or mixtures thereof to a subject with cancer.

Formula (I)

where $R_1$ is an alkenyl group, an alkyne group, a phenyl group, or an alkyl group.

In a preferred embodiment, the bis-(organoselanylurea)aryl agent is 1,1'-(methylenebis(4,1-phenylene))bis(3-(4-(methylselanyl)phenyl)urea).

In one embodiment, the cancer is a cancer cell line selected from the group consisting of human squamous cell carcinoma of the oral tongue (HN9), hepatocellular carcinoma (HuH7), pharynx squamous carcinoma (FaDu), breast cancer cell line (MCF7), hepatocellular carcinoma (HEPG2), non-small cell lung cancer (A549), colorectal carcinoma (HCT116), and melanoma cancer (A375). In some embodiments, the bis-(organoselanyl urea)aryl agent has a cancer cell growth inhibition percentage of at least 1%, preferably at least 2%, preferably at least 3%, preferably at least 4%, preferably at least 5%, preferably at least 6%, preferably at least 7%, preferably at least 8%, preferably at least 9%, preferably at least 10%, preferably at least 11%, preferably at least 12%, preferably at least 13%, preferably at least 14%, preferably at least 15%, preferably at least 16% preferably at least 17%, preferably at least 18%, preferably at least 19%, preferably at least 20%, preferably at least 21%, preferably at least 2%, preferably at least 23%, preferably at least 24% preferably at least 25%, preferably at least 26%, preferably at least 27%, preferably at least 28%, preferably at least 29%, preferably at least 30%. In a preferred embodiment, the bis-(organoselanyl urea)aryl agent has a cancer cell growth inhibition percentage of at least 31%.

In a specific embodiment, the bis-(organoselanyl urea) aryl agent has an HN9 inhibition percentage of at least 5% at a concentration of 100 μg/mL, preferably at least 6%, preferably at least 7%, preferably at least 8%, preferably at least 9%, most preferably at least 9.38%.

In a specific embodiment, the bis-(organoselanyl urea) aryl agent has an HuH7 inhibition percentage of at least 0.1% at a concentration of 100 μg/mL, preferably at least 0.15%, preferably at least 0.2%, preferably at least 0.25%, preferably at least 0.3%, preferably at least 0.35%, preferably at least 0.4%, preferably at least 0.45%, preferably at least 0.5%, preferably at least 0.55%, preferably at least 0.6%, preferably at least 0.65%, preferably at least 0.7% preferably at least 0.75%, preferably at least 0.8%, preferably at least 0.85%, preferably at least 0.9%, preferably at least 0.95%, preferably at least 1%, most preferably at least 1.35%.

In a specific embodiment, the bis-(organoselanyl urea) aryl agent has an FaDu inhibition percentage of at least 15% at a concentration of 100 μg/mL, preferably at least 16%, preferably at least 17%, preferably at least 18%, preferably at least 19%, preferably at least 20%, preferably at least 21%, preferably at least 22%, most preferably at least 22.48%.

In a specific embodiment, the bis-(organoselanyl urea) aryl agent has an MCF7 inhibition percentage of at least 5% at a concentration of 100 μg/mL, preferably at least 5.5%, preferably at least 6%, preferably at least 6.5%, preferably at least 7%, preferably at least 7.5%, most preferably at least 7.64%.

In a specific embodiment, the bis-(organoselanyl urea) aryl agent has an HEPG2 inhibition percentage of at least 20% at a concentration of 100 μg/mL, preferably at least 21%, preferably at least 22%, preferably at least 23%, preferably at least 24%, preferably at least 25%, preferably at least 26%, preferably at least 27%, preferably at least 28%, preferably at least 29%, preferably at least 30%, preferably at least 31%, most preferably at least 31.12%.

In a specific embodiment, the bis-(organoselanyl urea) aryl agent has an A549 inhibition percentage of at least 5% at a concentration of 100 μg/mL, preferably at least 6%, preferably at least 7%, preferably at least 8%, preferably at least 9%, preferably at least 10%, preferably at least 11%, preferably at least 12%, preferably at least 13%, preferably at least 14%, preferably at least 15%, most preferably at least 15.07%.

In a specific embodiment, the bis-(organoselanyl urea) aryl agent has an HCT116 inhibition percentage of at least 5% at a concentration of 100 μg/mL, preferably at least 6%, preferably at least 7%, preferably at least 8%, preferably at least 9%, most preferably at least 9.63%.

In a specific embodiment, the bis-(organoselanyl urea) aryl agent has an A375 inhibition percentage of at least 5% at a concentration of 100 μg/mL, preferably at least 6%, preferably at least 7%, preferably at least 8%, preferably at least 9%, preferably at least 10%, most preferably at least 10.53%.

In some embodiments, the bis-(organoselanyl urea)aryl agent has a non-cancer cell growth inhibition percentage of 15% or less against a non-cancer cell line, preferably 14% or less, preferably 13% or less, preferably 12% or less, preferably 11% or less, preferably 10% or less, preferably 9% or less, preferably 8% or less against a non-cancer cell line. The non-cancer cell line is at least one selected from a normal oral epithelial cell line (OEC) and a human skin fibroblast (HSF) normal cell line. A low non-cancer cell growth inhibition percentage is desirable because it shows the administered agent has an increased specificity with regards to cancer cell lines and is less cytotoxic for the subject undergoing administration of said agent.

In a specific embodiment, when the non-cancer cell line is HSF, the bis-(organoselanyl urea)aryl agent has a growth inhibition percentage of less than 15%, preferably less than 14%, preferably less than 13%, preferably less than 12%, preferably less than 11%, preferably less than 10%, most preferably 9.76% against a non-cancer cell line. In a specific embodiment, when the non-cancer cell line is OEC, the bis-(organoselanyl urea)aryl agent has a growth inhibition percentage of less than 15%, preferably less than 14%, preferably less than 13%, preferably less than 12%, preferably less than 11%, preferably less than 10%, preferably less than 9%, preferably less than 8%, most preferably 7.32% against a non-cancer cell line.

A method of preparing a bis-(organoselanyl urea)aryl agent compound of Formula (I) is described herein. The method comprises reacting a selenium aniline with a bis-phenyl isocyanate in an organic solvent to obtain a reaction mixture comprising the bis-(organoselanyl urea)aryl agent. In some embodiments, derivatives of selenium aniline or selenium anilines optionally substituted with alkyl groups, preferably alkyl groups with fewer than six carbon atoms such as methyl groups, ethyl groups, propyl groups, butyl groups, and/or pentyl groups, may also be used. Suitable examples of selenium aniline/selenium-containing aniline derivatives include, but are not limited to, phenylselanyl aniline, 4-(methylselanyl)aniline, etc. In a preferred embodiment, the selenium aniline is 4-(methylselanyl)aniline. Suitable examples of bis-phenyl isocyanate include, but are not limited to, 1,4-bis(isocyanatomethyl)benzene, bis(4-isocyanatophenyl)methane, 1,3-bis(isocyanatomethyl)benzene, 4,4'-diisocyanatodiphenylmethane, 1,4-phenylene diisocyanate, and/or combinations thereof. In a preferred embodiment, the bis-phenyl isocyanate is bis(4-isocyanatophenyl) methane.

In one embodiment, the selenium aniline is reacted with the bis-phenyl isocyanate in a molar ratio of about 1:5 to 5:1 selenium aniline to bis-phenyl isocyanate, preferably 1:4 to 4:1, preferably 1:3 to 3:1, preferably 1:2 to 3:1, preferably 1:1 to 3:1, preferably 2:1 to 3:1, most preferably about 2.2:1 selenium aniline to bis-phenyl isocyanate.

An organic solvent is generally used during the reaction to ensure proper dissolution of the reactants, the selenium aniline and the bis-phenyl isocyanate, and to aid in facilitating the reaction between the reactants (without participating in the reaction). Suitable organic solvents include, but are not limited to, acetone, acetonitrile, ethanol, formaldehyde, ether, ethyl acetate, toluene, hexane, and xylene. In a preferred embodiment, the organic solvent is toluene.

In some embodiments, the reaction between the selanyl-aminobenzene and the isocyanate is carried out at a temperature range of 15 to 80° C., preferably 16 to 79° C., preferably 17 to 78° C., preferably 18 to 77° C., preferably 19 to 76° C., preferably 20 to 75° C., preferably 21 to 74° C., preferably 22 to 73° C., preferably 23 to 72° C., preferably 24 to 71° C., preferably 25 to 70° C., preferably 25 to 69° C., preferably 25 to 68° C., preferably 25 to 67° C., preferably 25 to 66° C., preferably 25 to 65° C., preferably 25 to 64° C., preferably 25 to 63° C., preferably 25 to 62° C., preferably 25 to 61° C., most preferably 25 to 60° C. In some embodiments, it is possible to perform the reaction at higher temperatures, such as 80 to 100° C. as well.

In some embodiments, the method comprises stirring the reaction mixture for 6 to 10 hours at a speed of 300 to 800 rpm. In some embodiments, the reaction mixture is stirred for 5 to 9 hours, 6 to 8 hours, 7 to 8 hours, most preferably 8 hours. In some embodiments, the reaction mixture is stirred at a speed of 350 to 750 rpm, preferably 400 to 700 rpm, preferably 450 to 650 rpm, preferably 500 to 600 rpm, most preferably 600 rpm. In a preferred embodiment, the reaction mixture is stirred for 8 hours at a speed of 600 rpm. In one embodiment, the reaction mixture is stirred continuously to ensure proper mixing of the reactants and formation of bis-(organoselanyl urea)aryl agent as a solid precipitate.

In some embodiments, the method comprises isolating the precipitate to obtain the bis-(organoselanyl urea)aryl agent. In one embodiment, the precipitate is isolated by any known method in the art such as, but not limited to, centrifugation or filtration. In some embodiments, after isolation, the precipitate is washed with at least one organic solvent to remove any unwanted reactants, impurities, or by-products obtained during the reaction. Suitable organic solvents include, but are not limited to, acetone, acetonitrile, ethanol, formaldehyde, ether, ethyl acetate, toluene, hexane, and xylene. In another embodiment, the organic solvent is at least one of toluene, ethanol, and acetone. In a preferred embodiment, the precipitate is washed with toluene, ethanol, then water. In some embodiments, the product may be purified by any technique known in the art such as, but not limited to, re-crystallization or any other chromatographic technique.

In some embodiments, the bis-(organoselanyl urea)aryl agent may be included in a pharmaceutical composition, which may then be administered orally, systemically, parenterally, by inhalation spray, rectally, or topically in dosage unit formulations comprising conventional nontoxic pharmaceutically acceptable carriers, adjuvants, and vehicles as desired. In some embodiments, the method of administration of the steroid or an analogue or derivative thereof is oral. In other embodiments, the compound or an analogue or derivative thereof is administered by injection, such as, for example, through a peritumoral injection. Topical administration can also involve the use of transdermal administration, such as transdermal patches or iontophoresis devices.

Parenteral administration, as used herein, includes intravesical, intradermal, transdermal, subcutaneous, intramuscular, intralesional, intracranial, intrapulmonary, intracardial, intrasternal, and sublingual injections, or infusion techniques. Injectable preparations, for example, sterile injectable aqueous or oleaginous suspensions, can be Formulated according to the known art using suitable dispersing or wetting agents and suspending agents. The sterile injectable preparation can also be a sterile injectable solution or suspension in a nontoxic, parenterally acceptable diluent or solvent, for example, as a solution in 1,3-butanediol. Among the acceptable vehicles and solvents that can be employed are water, Ringer's solution, and isotonic sodium chloride solution. In addition, sterile, fixed oils are conventionally employed as a solvent or suspending medium. For this purpose, any fixed oil can be employed, including synthetic mono- or diglycerides. In addition, fatty acids such as oleic acid are used in the preparation of injectables. Dimethyl acetamide, surfactants including ionic and non-ionic detergents, and polyethylene glycols can be used. Mixtures of solvents and wetting agents, such as those discussed above, are also useful. Suppositories for rectal administration of the compound or an analogue or derivative thereof can be prepared by mixing the steroid or an analogue or derivative thereof with a suitable non-irritating excipient such as cocoa butter, synthetic mono- di- or triglycerides, fatty acids, and polyethylene glycols that are solid at ordinary temperatures but liquid at the rectal temperature and will therefore melt in the rectum and release the drug.

For therapeutic purposes, formulations for parenteral administration can be in the form of aqueous or non-aqueous isotonic sterile injection solutions or suspensions. These solutions and suspensions can be prepared from sterile powders or granules having one or more of the carriers or diluents mentioned for use in the formulations for oral administration. A contemplated steroid or an analogue or derivative thereof of the present disclosure can be dissolved in water, polyethylene glycol, propylene glycol, ethanol, corn oil, cottonseed oil, peanut oil, sesame oil, benzyl alcohol, sodium chloride, and/or various buffers. Other adjuvants and modes of administration are well and widely known in the pharmaceutical art.

Solid dosage forms for oral administration can include capsules, tablets, pills, powders, and granules. In such solid dosage forms, the compounds of this disclosure are ordinarily combined with one or more adjuvants appropriate to the indicated route of administration. If administered as a solid dosage form, a contemplated steroid or an analogue or derivative thereof can be admixed with lactose, sucrose, starch powder, cellulose esters of alkanoic acids, cellulose alkyl esters, talc, stearic acid, magnesium stearate, magnesium oxide, sodium and calcium salts of phosphoric and sulfuric acids, gelatin, acacia gum, sodium alginate, polyvinylpyrrolidone, and/or polyvinyl alcohol, and then tableted or encapsulated for convenient administration. Such capsules or tablets can contain a controlled-release formulation, as can be provided in a dispersion of the active compound in hydroxypropyl methylcellulose. In the case of capsules, tablets, and pills, the dosage forms can also comprise buffering agents such as sodium citrate, magnesium or calcium carbonate, or bicarbonate. Tablets and pills can additionally be prepared with enteric coatings.

Liquid dosage forms for oral administration can include pharmaceutically acceptable emulsions, solutions, suspensions, syrups, and elixirs containing inert diluents commonly used in the art, such as water. Such compositions can also comprise adjuvants, such as wetting agents, emulsifying and suspending, agents, and sweetening, flavoring, and perfuming agents.

The amount of the bis-(organoselanyl urea)aryl agent of Formula (I) that can be combined with the carrier materials to produce a single dosage form varies depending upon the mammalian subject treated and the particular mode of administration. The dosage and treatment duration are dependent on factors, such as the bioavailability of a drug, administration mode, toxicity of a drug, gender, age, lifestyle, body weight, the use of other drugs and dietary supplements, the disease stage, tolerance, and resistance of the body to the administered drug, etc., and then determined and adjusted accordingly. Cancers such as but not limited to sarcomas, carcinomas, melanomas, myelomas, gliomas, and lymphomas can be treated or prevented with the bis-(organoselanyl urea)aryl agent of Formula (I) provided herein. In some embodiments, a pharmaceutical composition incorporating the bis-(organoselanyl urea)aryl agent of Formula (I) is present in an amount effective for treating a patient having a proliferative disorder selected from the group consisting of head and neck cancer, breast cancer, lung cancer, colon cancer, prostate cancer, gliomas, glioblastoma, astrocytomas, glioblastoma multiforme, Bannayan-Zonana syndrome, Cowden disease, Lhermitte-Duclos disease, inflammatory breast cancer, Wilm's tumor, Ewing's sarcoma, rhabdomyosarcoma, ependymoma, medulloblastoma, kidney cancer, liver cancer, melanoma, pancreatic cancer, sarcoma, osteosarcoma, giant cell tumor of bone, thyroid cancer, lymphoblastic T-cell leukemia, chronic myelogenous leukemia, chronic lymphocytic leukemia, hairy-cell leukemia, acute lymphoblastic leukemia, acute myelogenous leukemia, acute myeloid lymphoma (AML), chronic neutrophilic leukemia, acute lymphoblastic T-cell leukemia, plasmacytoma, immunoblastic large cell leukemia, mantle cell leukemia, multiple myeloma megakaryoblastic leukemia, multiple myeloma, acute megakaryocytic leukemia, promyelocytic leukemia, erythroleukemia, malignant lymphoma, Hodgkin's lymphoma, non-Hodgkin's lymphoma, lymphoblastic T-cell lymphoma, Burkitt's lymphoma, follicular lymphoma, neuroblastoma, bladder cancer, urothelial cancer, vulval cancer, cervical cancer, endometrial cancer, renal cancer, mesothelioma, esophageal cancer, salivary gland cancer, hepatocellular cancer, gastric cancer, nasopharyngeal cancer, buccal cancer, cancer of the mouth, gastrointestinal stromal tumor (GIST), testicular cancer, and the like.

The methods for treating cancer and other proliferative disorders described herein inhibit, remove, eradicate, reduce, regress, diminish, arrest, or stabilize a cancerous tumor, including at least one of the tumor growth, tumor cell viability, tumor cell division, and proliferation, tumor metabolism, blood flow to the tumor and metastasis of the tumor. In some embodiments, after treatment with the bis-(organoselanyl urea)aryl agent of Formula (I) or a pharmaceutical composition thereof, the size of a tumor, whether by volume, weight, or diameter, is reduced relative to the tumor size before treatment. In other embodiments, after treatment with the bis-(organoselanyl urea)aryl agent of Formula (I) or a pharmaceutical composition thereof, the size of a tumor does not reduce but is maintained the same as the tumor size before treatment.

The dosage and treatment duration are dependent on factors such as the bioavailability of a drug, administration mode, toxicity of a drug, gender, age, lifestyle, body weight, the use of other drugs and dietary supplements, cancer stage, tolerance, and resistance of the body to the administered drug, etc., then determined and adjusted accordingly. In at least one embodiment, the bis-(organoselanyl urea)aryl agent of Formula (I), the salt thereof, the solvate thereof, or the combination thereof is administered in an effective amount in a range of 0.01 to 100 mg/kg based on the weight of the subject, preferably 0.01 to 95 mg/kg, preferably 0.01 to 90 mg/kg, preferably 0.01 to 85 mg/kg, preferably 0.01 to 80 mg/kg, preferably 0.01 to 75 mg/kg, preferably 0.01 to 70 mg/kg, preferably 0.01 to 65 mg/kg, preferably 0.01 to 60 mg/kg, preferably 0.01 to 55 mg/kg, preferably 0.01 to 50 mg/kg, preferably 0.01 to 45 mg/kg, preferably 0.01 to 40 mg/kg, preferably 0.01 to 35 mg/kg, preferably 0.01 to 30 mg/kg, preferably 0.01 to 25 mg/kg, preferably 0.01 to 20 mg/kg, preferably 0.01 to 15 mg/kg, most preferably 0.01 to 10 mg/kg based on the weight of the subject.

The bis-(organoselanyl urea)aryl agent of Formula (I) or a pharmaceutical composition thereof may be administered in a single dose or multiple individual divided doses. In some embodiments, the interval of time between the administration of bis-(organoselanyl urea)aryl agent of Formula (I) or a pharmaceutical composition thereof and the administration of one or more additional therapies may be about every hour, every 1 to 2 hours, every 2 to 6 hours, every 2 to 12 hours, every 12 to 24 hours, every 1 to 2 days, every 2 days, every 3 days, every 4 days, every 5 days, every 6 days, every 7 days, every 1 week, every 2 weeks, every 3 weeks, every month, every 2 months, every 3 months, every 4 months, every 5 months, every 6 months, or any period in between.

In certain embodiments, the bis-(organoselanyl urea)aryl agent of Formula (I) of the present disclosure or a pharmaceutical composition thereof may be used in combination with one or more other antineoplastic or chemotherapeutic agents. A non-limiting list of examples of chemotherapeutic agents are aflibercept, asparaginase, bleomycin, busulfan, carmustine, chlorambucil, cladribine, cyclophosphamide, cytarabine, dacarbazine, daunorubicin, doxorubicin, etoposide, fludarabine, gemcitabine, hydroxyurea, idarubicin, ifosamide, irinotecan, lomustine, mechlorethamine, melphalan, mercaptopurine, methotrexate, mitomycin, mitoxantrone, pentostatin, procarbazine, 6-thioguanine, topotecan, vinblastine, vincristine, retinoic acid, oxaliplatin, cis-platin, carboplatin, 5-FU (5-fluorouracil), teniposide, amsacrine, docetaxel, paclitaxel, vinorelbine, bortezomib, clofarabine, capecitabine, actinomycin D, epirubicin, vindesine, methotrexate, tioguanine (6-thioguanine), tipifarnib. Examples of antineoplastic agents which are protein kinase inhibitors include imatinib, erlotinib, sorafenib, sunitinib, dasatinib, nilotinib, lapatinib, gefitinib, temsirolimus, everolimus, rapamycin, bosutinib, pazopanib, axitinib, neratinib, vatalanib, pazopanib, midostaurin, and enzastaurin. Examples for antineoplastic agents which are antibodies comprise trastuzumab, cetuximab, panitumumab, rituximab, bevacizumab, mapatumumab, conatumumab, lexatumumab and the like.

Aspects of the present disclosure provide a method for inhibiting the proliferation of cancer cells in the human body. As described, the method is efficient, economically sustainable, and easily employable.

EXAMPLES

The following examples demonstrate a method of treating cancer using a bis-(organoselanyl urea)aryl agent as described herein. The examples are provided solely for illustration and are not to be construed as limitations of the present disclosure, as many variations thereof are possible without departing from the spirit and scope of the present disclosure.

Example 1: Synthesis of Compound 1,1'-(methylenebis(4,1-phenylene))bis(3-(4-(methylselanyl)phenyl)urea) (HB190)

Figure 1:
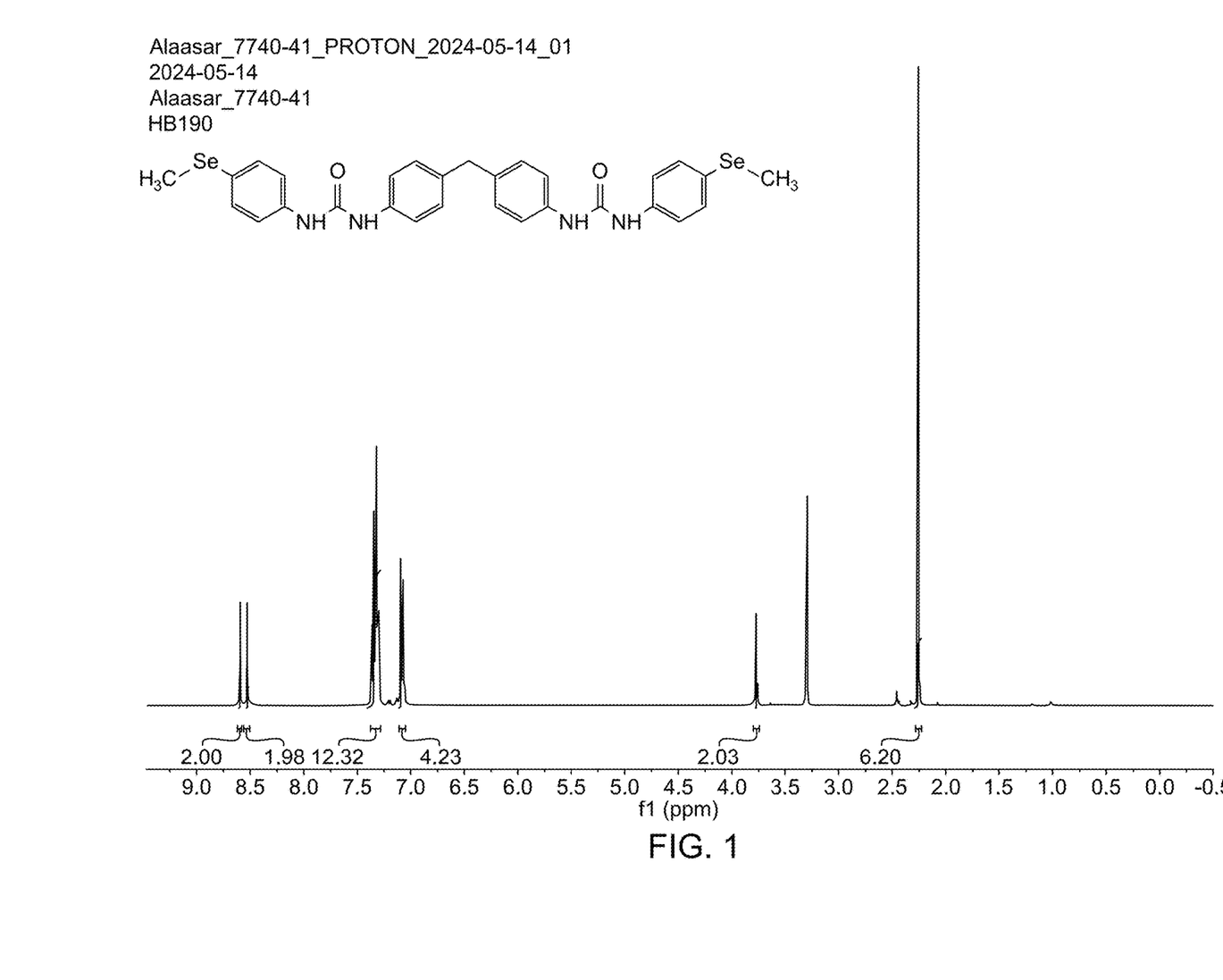
FIG. 1 is an exemplary illustration of the $^1$H nuclear magnetic resonance (NMR) spectrum of the bis-(organoselanyl urea)aryl agent showing characteristic aromatic and aliphatic proton signals, according to certain embodiments.
Figure 2:
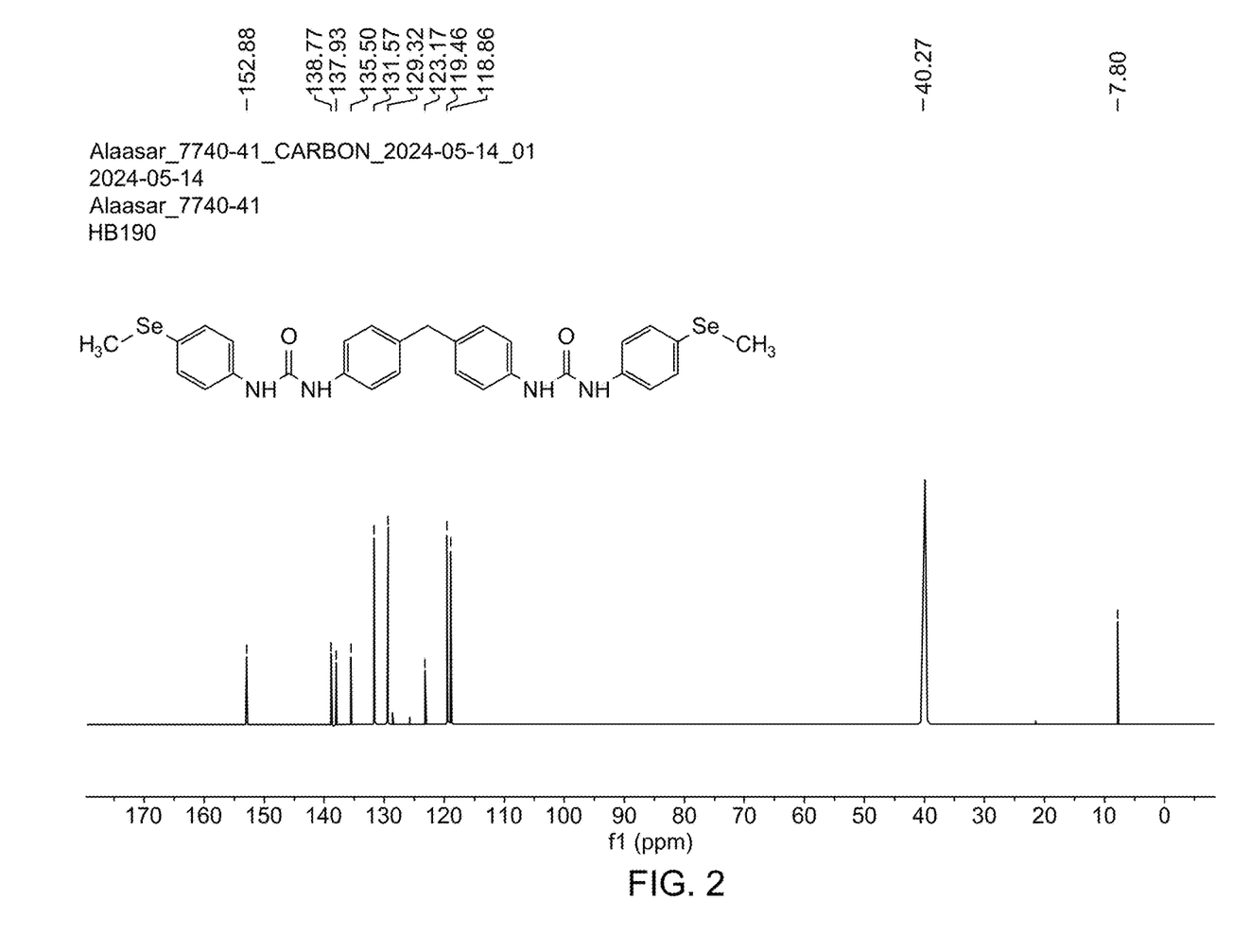
FIG. 2 is an exemplary illustration of the $^{13}$C NMR spectrum of the bis-(organoselanyl urea)aryl agent showing distinct carbon signals, including aromatic and aliphatic regions, according to certain embodiments.
Figure 3:
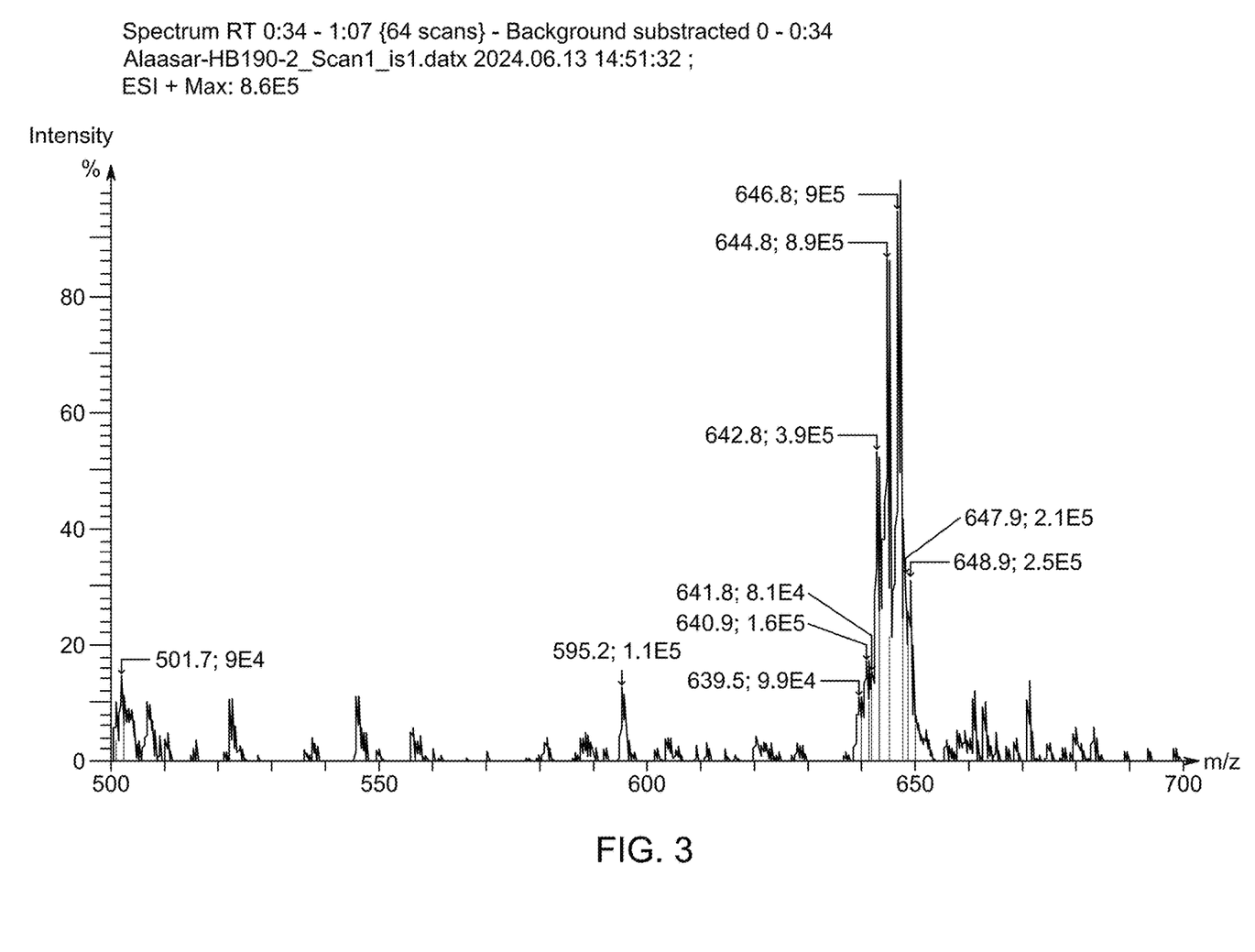
FIG. 3 is an exemplary illustration of the mass spectrum of the bis-(organoselanyl urea)aryl agent, according to certain embodiments.
Figure 4:
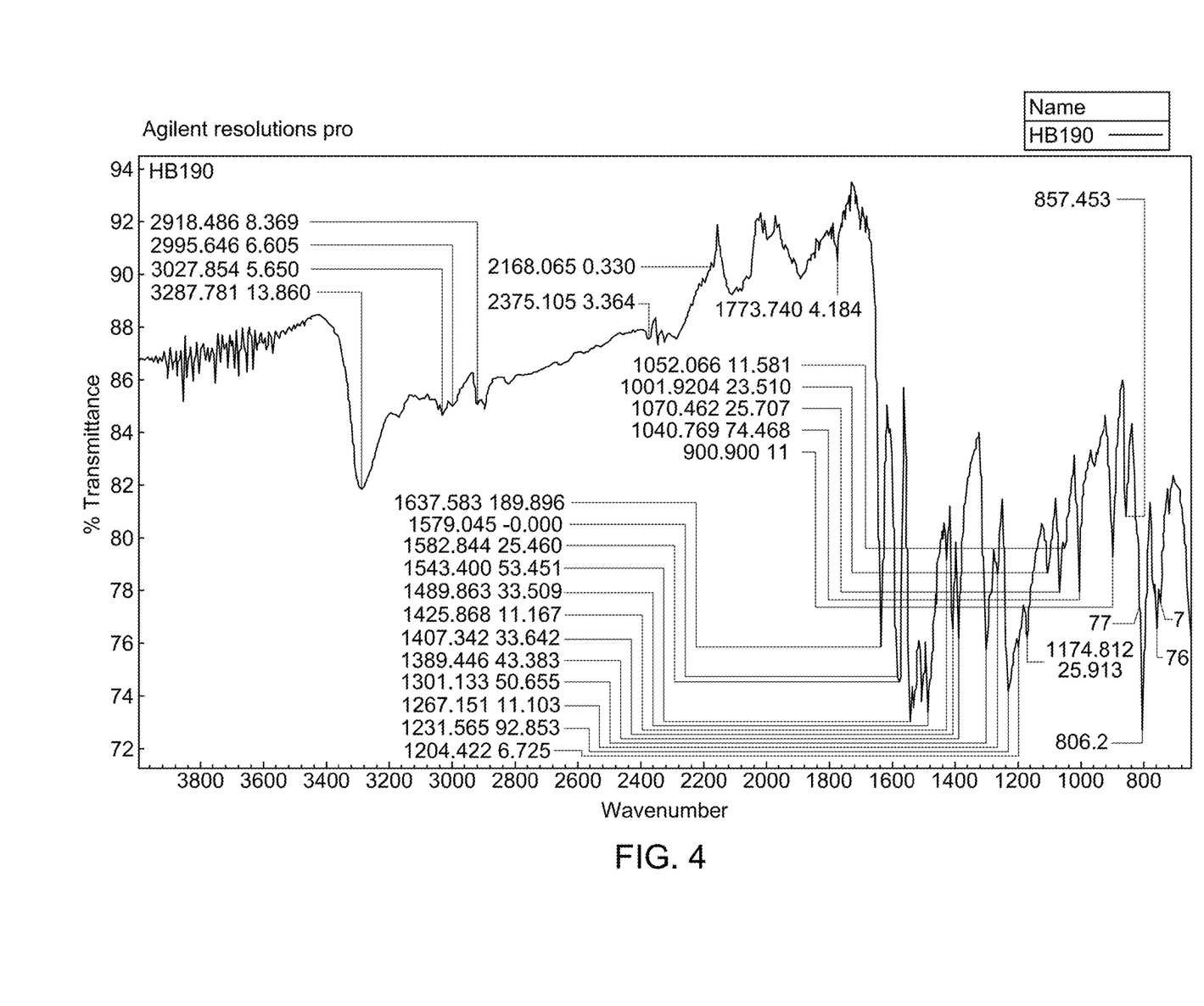
FIG. 4 is an exemplary illustration of the Fourier Transform Infrared (FTIR) spectrum of the bis-(organoselanyl urea)aryl agent, according to certain embodiments.

HB190 was synthesized from the reaction of 4-(methylselanyl)aniline (2.2 mmol) and bis(4-isocyanatophenyl)methane (1 mmol) in toluene (10 ml). The reaction was vigorously stirred for 8 hrs. The formed precipitate was isolated by filtration and washed several times with warm toluene, ethanol, then with water and dried to give HB190. The product formation was followed by TLC: pet. ether/ethyl acetate (1:1)]; white powder; yield=92%; MP=312-314° C. FT-IR (v, cm$^{-1}$): 3287, 3027, 2995, 1637, 1579, 1582, 1543, 1489, 1389, 1231, 806; $^1$H NMR (400 MHz, DMSO-d6) δ 8.59 (s, 2H), 8.53 (s, 2H), 7.38-7.28 (m, 12H), 7.08 (d, J=8.5 Hz, 4H), 3.77 (s, 2H), 2.28-2.23 (s, 6H); $^{13}$C NMR (101 MHz, DMSO-d6) δ 152.88, 138.77, 137.93, 135.50, 131.57, 129.32, 123.17, 119.46, 118.86, 40.27, 7.80; MS (ESI): m/z=found 646.8 [M+$^+$Na]; calcd. 624.0 [M+]; 647.0 [M+$^+$Na]. The product formation was followed by TLC: pet. ether/ethyl acetate (1:1)]; Rf=0.44; white powder; yield=60%; MP=240-241° C. $^1$H NMR (400 MHz, DMSO-d6) δ 8.36 (s, 1H), 8.25 (s, 1H), 7.33-7.20 (m, 8H), 6.17 (t, J=6.2 Hz, 1H), 5.91 (d, J=7.9 Hz, 1H), 3.87-3.64 (m, 2H), 2.82 (dd, J=37.4, 13.2, 6.2 Hz, 3H), 2.46 (dt, J=3.6, 1.8 Hz, 1H), 1.55 (t, J=13.8 Hz, 3H), 1.15-1.02 (m, 2H), 1.00 (s, 3H), 0.97 (s, 3H), 0.93-0.80 (m, 6H) (FIG. 1); $^{13}$C NMR (101 MHz, DMSO-d$_6$) δ 155.72, 154.78, 139.67, 139.60, 131.75, 131.64, 122.03, 122.01, 118.85, 118.77, 53.21, 47.34, 46.55, 42.86, 42.24, 36.54, 35.40, 32.00, 27.98, 23.65, 7.93, 7.87 (FIG. 2); MS (ESI): m/z=found 618.8 [M+$^+$Na]; calcd. 596.1 [M+]; 619.0 [M+$^+$Na](FIG. 3); FT-IR (v, cm-1): 3363, 3299, 2926, 1686, 1644, 1560, 1587, 1541, 1236, 816, 502 (FIG. 4).

Example 2: Evaluation of Anti-Cancer Activity of Compound 1,1'-(methylenebis(4,1-phenylene))bis(3-(4-(methylselanyl)phenyl)urea) (HB190)

Figure 5:
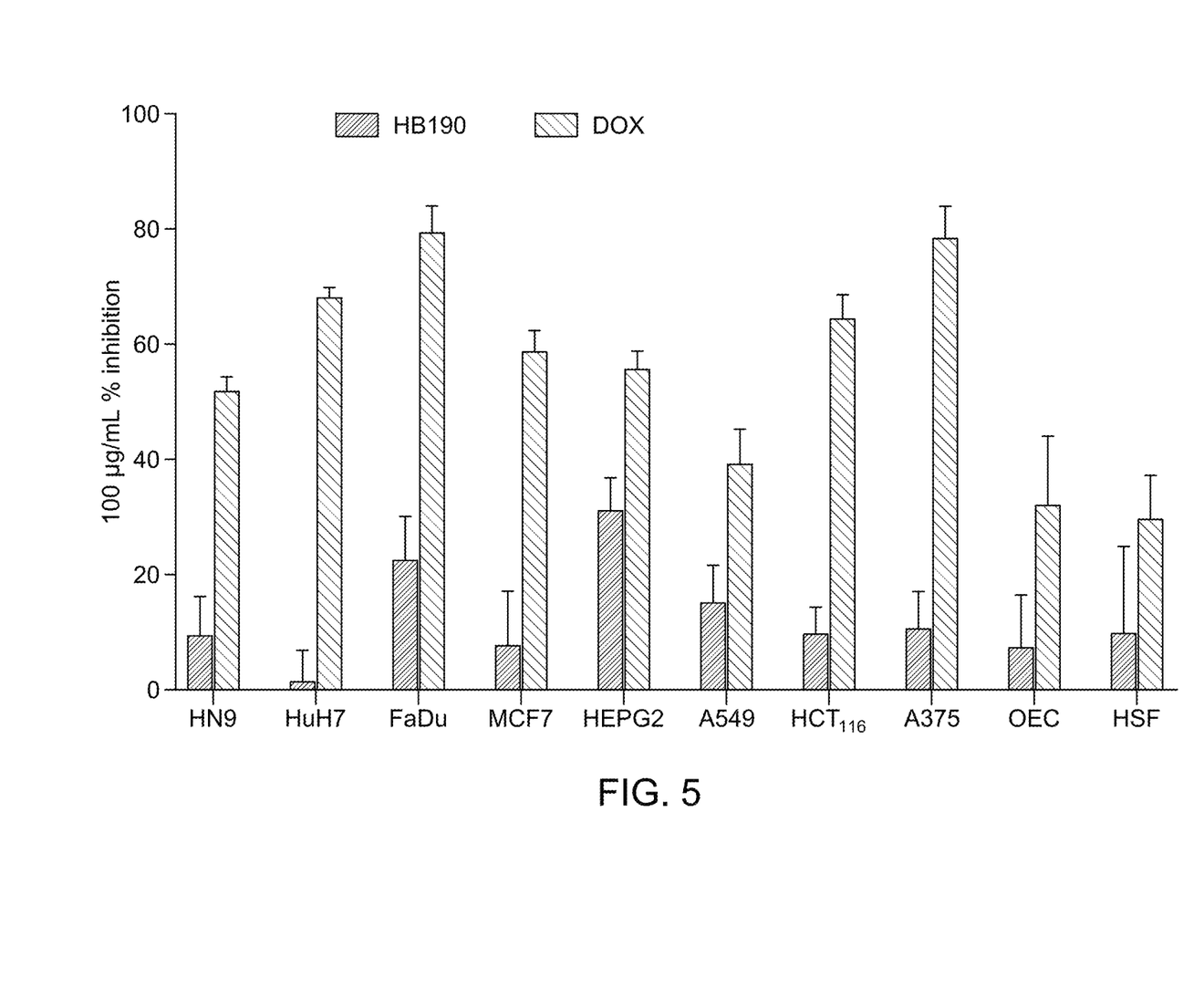
FIG. 5 compares the effect of the bis-(organoselanyl urea)aryl agent and doxorubicin on various cell lines, human squamous cell carcinoma of the oral tongue (HN9), hepatocellular carcinoma (HuH7), pharynx squamous carcinoma (FaDu), breast cancer cell line (MCF7), hepatocellular carcinoma (HEPG2), non-small cell lung cancer (A549), colorectal carcinoma (HCT116), melanoma cancer (A375), oral epithelial cell line (OEC) and a human skin fibroblast (HSF) normal cell line, at a concentration of 100 µg/mL, according to certain embodiments.

The effect of HB190 in cancer treatment is evaluated, and the results indicate that HB190 showed weak antitumor activities against human squamous cell carcinoma of the oral tongue (HN9), hepatocellular carcinoma (HuH7), pharynx squamous carcinoma (FaDu), breast cancer cell line (MCF7), hepatocellular carcinoma (HEPG2), non-small cell lung cancer (A549), colorectal carcinoma (HCT116), and melanoma cancer (A375) with growth inhibition percentages of 74.05, 88.57, 77.27, 67.74, 76.22, 74.37, 85.35, 66.84%, at a concentration of 100 μg/mL, compared to doxorubicin (51.73, 67.98, 79.33, 58.64, 55.61, 39.14, 64.35, and 78.25%), respectively (FIG. 5). Moreover, its safety was confirmed by low growth inhibition percentages of 7.32 and 9.76% towards the normal oral epithelial cell line (OEC) and the human skin fibroblast normal cell (HSF), compared to 31.96 and 29.57% and for doxorubicin (FIG. 5). The antitumor activities of the bis-(organoselanyl urea) aryl agent against all tested cell lines were evaluated by sulphorhodamine-B (SRB) assay. Briefly, cells were seeded at a density of 3×103 cells/well in 96-well microtiter plates. They were left to attach for 24 h before incubation with the aforementioned compound. Next, cells were treated with 100 μg/mL for bis-(organoselanyl urea)aryl agent. For each concentration, three wells were used, and incubation was continued for 48 h. DMSO was used as a control vehicle (1% v/v). At the end of incubation, cells were fixed with 20% trichloroacetic acid and stained with 0.4% SRB dye. The optical density (O.D.) of each well was measured spectrophotometrically at 570 nm using an ELISA microplate reader (TECAN Sunrise™, Germany). The mean survival fraction at each drug concentration was calculated as follows: O.D. of the treated cells/O.D. of the control cells. The IC$_{50}$ (concentration that produces 50% of cell growth inhibition) value of bis-(organoselanyl urea)aryl agent was calculated using sigmoidal dose-response curve-fitting models.

Numerous modifications and variations of the present disclosure are possible in light of the above teachings. It is, therefore, to be understood that within the scope of the appended claims, the invention may be practiced otherwise than as specifically described herein.

The invention claimed is:

1. A method for inhibiting in vitro growth of a cancer cell of a cancer cell line selected from the group consisting of HN9, HuH7, FaDu, MCF7, HEPG2, A549, HCT116, and A375, comprising:

contacting the cancer cell with a bis-(organoselanyl urea) aryl agent of formula (I):

wherein R$_1$ is methyl, ethyl, n-propyl, isopropyl, n-butyl, isobutyl, sec-butyl, or t-butyl.

2. The method of claim 1, wherein the contacting of the bis-(organoselanyl urea)aryl agent provides a cancer cell growth inhibition percentage of at least 5%.

3. The method of claim 1, wherein the cell line is the HN9.

4. The method of claim 1, wherein the contacting of the cancer cell with the bis-(organoselanyl urea)aryl agent provides a cancer cell growth inhibition percentage of at least 5% against HCT116.

5. The method of claim 1, wherein the contacting of the cancer cell with the bis-(organoselanyl urea)aryl agent provides a cancer cell growth inhibition percentage of at least 9% against HN9.

6. The method of claim 1, wherein the cell line is HuH7.
7. The method of claim 1, wherein the cell line is FaDu.
8. The method of claim 1, wherein the cell line is MCF7.
9. The method of claim 1, wherein the cell line is HEPG2.
10. The method of claim 1, wherein the cell line is A549.
11. The method of claim 1, wherein the cell line is HCT116.
12. The method of claim 1, wherein the cell line is A375.
13. The method of claim 1, wherein R$_1$ in the bis-(organoselanyl urea)aryl agent of formula (I) is methyl.
14. The method of claim 1, wherein R$_1$ in the bis-(organoselanyl urea)aryl agent of formula (I) is ethyl.
15. The method of claim 1, wherein R$_1$ in the bis-(organoselanyl urea)aryl agent of formula (I) is n-propyl.
16. The method of claim 1, wherein R$_1$ in the bis-(organoselanyl urea)aryl agent of formula (I) is isopropyl.

* * * * *